United States Patent
Jancik et al.

(10) Patent No.: US 8,657,933 B2
(45) Date of Patent: Feb. 25, 2014

(54) POWDER COATING SYSTEM WITH EASILY CLEANABLE CYCLONE

(75) Inventors: Larry C. Jancik, North Olmstead, OH (US); William C. Coomer, III, Piqua, OH (US); Greg Dawson, Niceville, FL (US); Michael Thomas, Grafton, OH (US); Francis Patrick Mohar, Avon Lake, OH (US)

(73) Assignee: Nordson Corporation, Westlake, OH (US)

( * ) Notice: Subject to any disclaimer, the term of this patent is extended or adjusted under 35 U.S.C. 154(b) by 46 days.

(21) Appl. No.: 13/285,452

(22) Filed: Oct. 31, 2011

(65) Prior Publication Data

US 2013/0047854 A1 Feb. 28, 2013

Related U.S. Application Data

(60) Provisional application No. 61/529,387, filed on Aug. 31, 2011.

(51) Int. Cl.
*B01D 45/12* (2006.01)

(52) U.S. Cl.
USPC .................. 95/271; 55/356; 55/429; 118/326

(58) Field of Classification Search
USPC .................. 55/356, 429; 118/326; 95/271
See application file for complete search history.

(56) References Cited

U.S. PATENT DOCUMENTS

| | | | |
|---|---|---|---|
| 3,197,955 A * | 8/1965 | Cohn et al. | 60/297 |
| 5,788,728 A | 8/1998 | Solis et al. | |
| 6,080,217 A | 6/2000 | Gobl et al. | |
| 6,458,209 B1 | 10/2002 | Shutic | |
| 7,014,556 B2 | 3/2006 | Ainsworth et al. | |
| 7,325,750 B2 | 2/2008 | Shutic et al. | |
| 2008/0017103 A1 | 1/2008 | Fulkerson et al. | |

FOREIGN PATENT DOCUMENTS

| DE | 20120247 | 4/2003 |
|---|---|---|
| EP | 1080789 B1 | 3/2001 |
| WO | 2010/052675 | 5/2010 |

* cited by examiner

*Primary Examiner* — Dung H Bui

(74) *Attorney, Agent, or Firm* — Calfee, Halter & Griswold LLP

(57) ABSTRACT

A powder cyclone separator for use in a powder coating system is formed in two separate and separable sections. An upper section is mounted on a first frame and remains stationary. A lower section is mounted on a second frame that is movable laterally away from the first frame so that an operator has more ready access to clean interior surfaces of the upper section. Optionally, actuators may be provided to raise and lower the cyclone lower section with respect to the cyclone upper section. Optional alignment means are presented for aligning the cyclone upper and lower sections. A control mechanism may be mounted on the second frame which includes a switch that is operable to raise and lower the lower section with respect to the upper section. This design allows an operator to see and verify that virtually all internal surfaces of the cyclone have been cleaned.

25 Claims, 7 Drawing Sheets

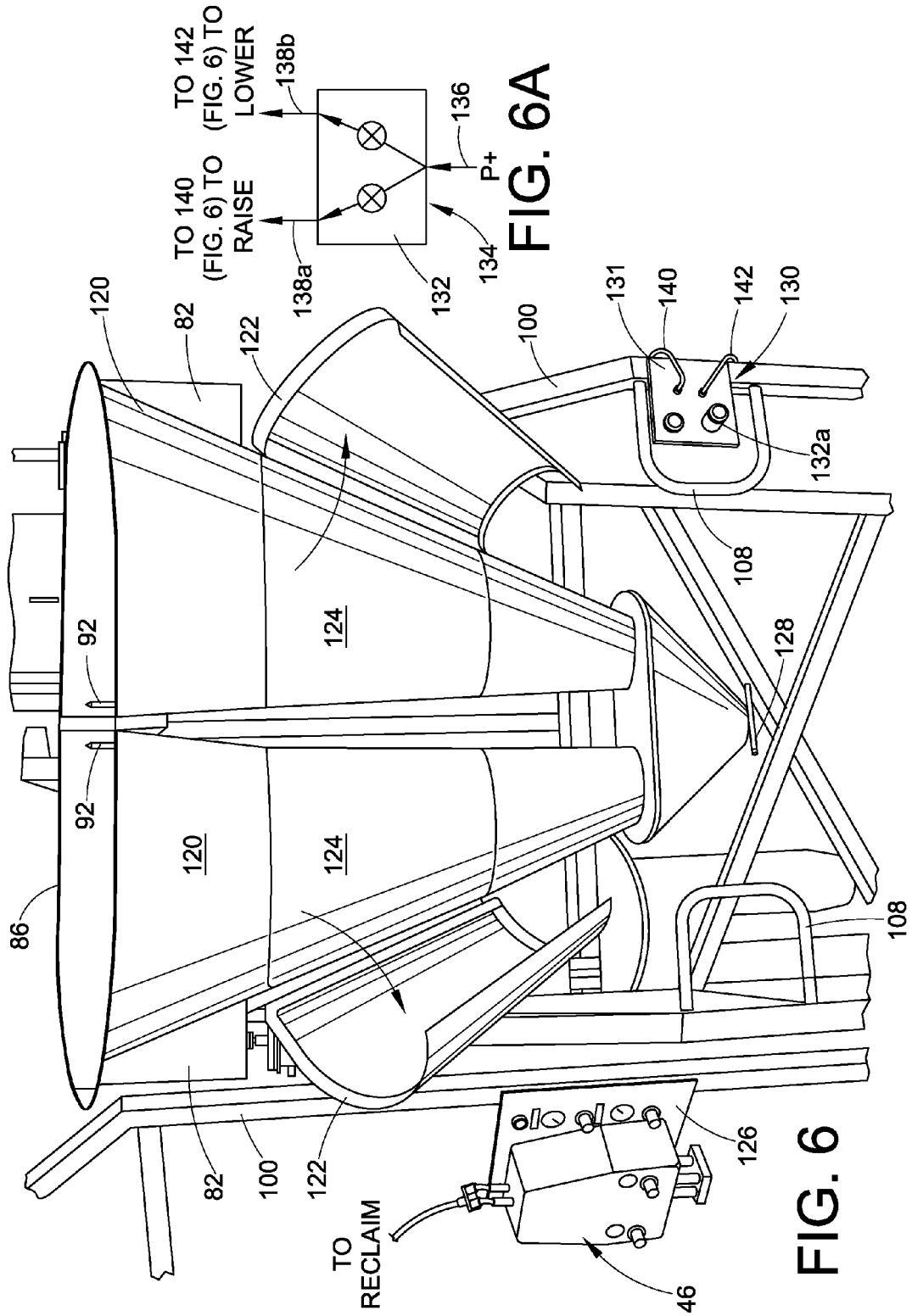

POWDER COATING SYSTEM WITH EASILY CLEANABLE CYCLONE

RELATED APPLICATION

The present patent application claims the benefit of U.S. provisional patent application Ser. No. 61/529,387 filed on Aug. 31, 2011 for POWDER CYCLONE SEPARATOR DISCONNECT ASSEMBLY DEVICE FOR EASE OF CLEANING DIFFICULT POWDER MATERIALS, the entire disclosure of which is fully incorporated herein by reference.

SUMMARY OF THE DISCLOSURE

The inventions relate generally to powder cyclone separators such as may be used with powder coating systems and processes. More particularly, the inventions relate to a powder cyclone separator that is constructed in two sections so that the sections can be separated easily for cleaning and other maintenance activities.

BACKGROUND OF THE DISCLOSURE

Powder coating materials are typically applied to objects or workpieces by spray application apparatus and processes. These spray application apparatus and processes include electrostatic and non-electrostatic processes as are well known. Spray application of powder coating material to workpieces often is done in a spray booth that is used to contain and recover powder overspray that does not adhere to the workpieces during a powder coating operation. Powder overspray may be recovered from the booth and either recycled back to the feed center for re-use or otherwise disposed to waste or other uses. A powder cyclone separator is commonly used as part of a powder recovery system whereby powder overspray entrained air is drawn from the spray booth through duct work into a cyclone separator which operates to remove powder that is entrained in the air volume. The separated powder falls to the bottom of the powder cyclone separator where it is then transferred to a receptacle. One of the more significant aspects of any powder coating system is a powder coating material change operation and the associated system down time and labor involved in such changeovers. For example, when the color of the applied powder needs to be changed, the entire system must be cleaned and purged of the just used color before the next color can be applied. This involves the clean and purge of spray guns, feed hoses, the spray booth and the cyclone separator.

SUMMARY OF THE INVENTION

In accordance with one aspect of the one or more inventions disclosed herein, an embodiment of a powder coating system may include a powder coating booth, a cyclone that includes a first or upper section and a second or lower section. Each section may be supported on a frame so that the lower section can be moved laterally with respect to the upper section. In one embodiment, the movement of the lower section provides access for cleaning the upper section. In another embodiment, the lower section can be vertically separated from the upper section to allow the lower section to be moved laterally. In another embodiment, the frame allows the lower section to be rolled laterally away from the upper section.

In accordance with another aspect of the one or more inventions disclosed herein, an embodiment of a cyclone for a powder recovery system may include an upper section and a lower section, with the lower section being supported on a frame that is moveable with respect to the upper section. In another embodiment, an actuator assembly can raise and lower the lower section relative to the upper section.

In accordance with another aspect of the one or more inventions disclosed herein, an embodiment of a powder coating system includes a powder coating booth, a cyclone for removing powder overspray from the powder coating booth, the cyclone comprising an upper section and a lower section, with the upper and lower sections being vertically separable from each other. In another embodiment, a frame supports the cyclone upper section and the cyclone lower section so that the cyclone lower section can be moved laterally away from the cyclone upper section, wherein the frame comprises a first frame for supporting the cyclone upper section in a stationary position and a second frame for supporting the cyclone lower section. In another embodiment, the second frame comprises a floor support that allows the second frame to be rolled away from the first frame with the cyclone lower section supported on the second frame. In another embodiment, the powder coating system further comprises an actuator assembly for vertically separating the cyclone lower section from the cyclone upper section.

In accordance with another aspect of the one or more inventions disclosed herein, a method for cleaning a cyclone separator used in a powder recovery system may include the steps of providing suction for the cyclone to draw powder overspray into the cyclone, cleaning an interior surface of a lower section of the cyclone, lowering the lower section of the cyclone to vertically separate the lower section of the cyclone from an upper section of the cyclone, and moving the lower section away from the upper section to provide easy access the upper section to allow the upper section to be thoroughly cleaned. This method permits the operator to see, and therefore clean, virtually all interior surfaces of the cyclone. Prior to the inventions described herein, it was not possible for the operator to see virtually all the interior surfaces of the cyclone and consequently, the operator could not verify that all the internal surfaces of the cyclone had been cleaned of residual powder to prevent, or reduce the risk, of subsequent cross-contamination of powder coating materials when changing from one color powder coating material to another.

These and other aspects and advantages of the one or more inventions will be readily understood and appreciated from the following detailed description hereinafter and the accompanying drawings.

BRIEF DESCRIPTION OF THE DRAWINGS

FIG. 6 is an enlarged view of a lower section of the cyclone of FIG. 1 showing additional features; and FIG. 6A is a simplified schematic of a valve control for actuators used to raise and lower one section of the cyclone of FIG. 1.

DETAILED DESCRIPTION OF THE EXEMPLARY EMBODIMENTS

Figure 1:
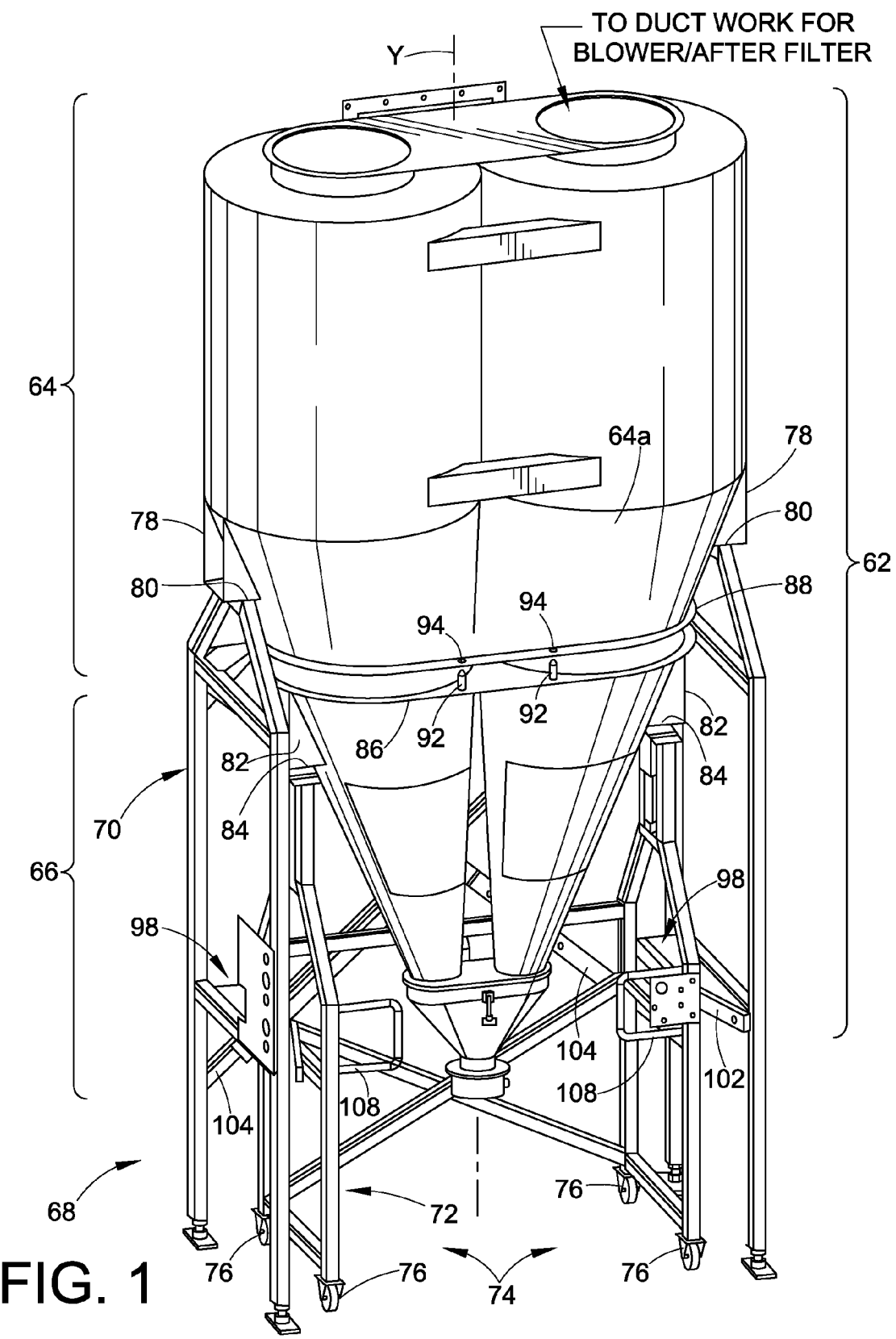
FIG. 1 is a perspective elevation of an embodiment of a powder cyclone separator in accordance with inventive concepts of the present disclosure.

Although the various embodiments herein illustrate a particular form and structure of a powder cyclone separator, also referred to herein as a cyclone, the various inventions may be used alone, in various combination and/or collectively with different cyclone designs. The basic structural features of a cyclone that the present disclosure utilizes is an intake section that receives a flow of powder entrained air at a tangential inlet to the intake section, and a powder recovery section through which cyclonically separated powder falls to a cyclone outlet. A cyclone may have many other optional structural features which form no required structure in order to practice the inventions herein. All other exemplary embodiments herein of various components of a powder coating system, such as but not limited to the spray booth, feed center, spray guns and so on are optional design features that may be selected for a particular spray coating operation or processes. In other words, the cyclone concepts disclosed herein may be used with a wide variety of system features including a feed center for supplying powder coating material, spray guns, electronic control systems for the spray booth, spray guns, gun control systems, gun movers, reciprocators, oscillators, overhead conveyor systems, and so on. The inventions also are not limited to any particular spray technology, and may include but not limited to electrostatic, tribo-electric, non-electrostatic, hybrid technologies, as well as automatic and manual application systems, as well as being used with dense phase and/or dilute phase powder conveyance technologies.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

INTRODUCTION

Figure 1A:
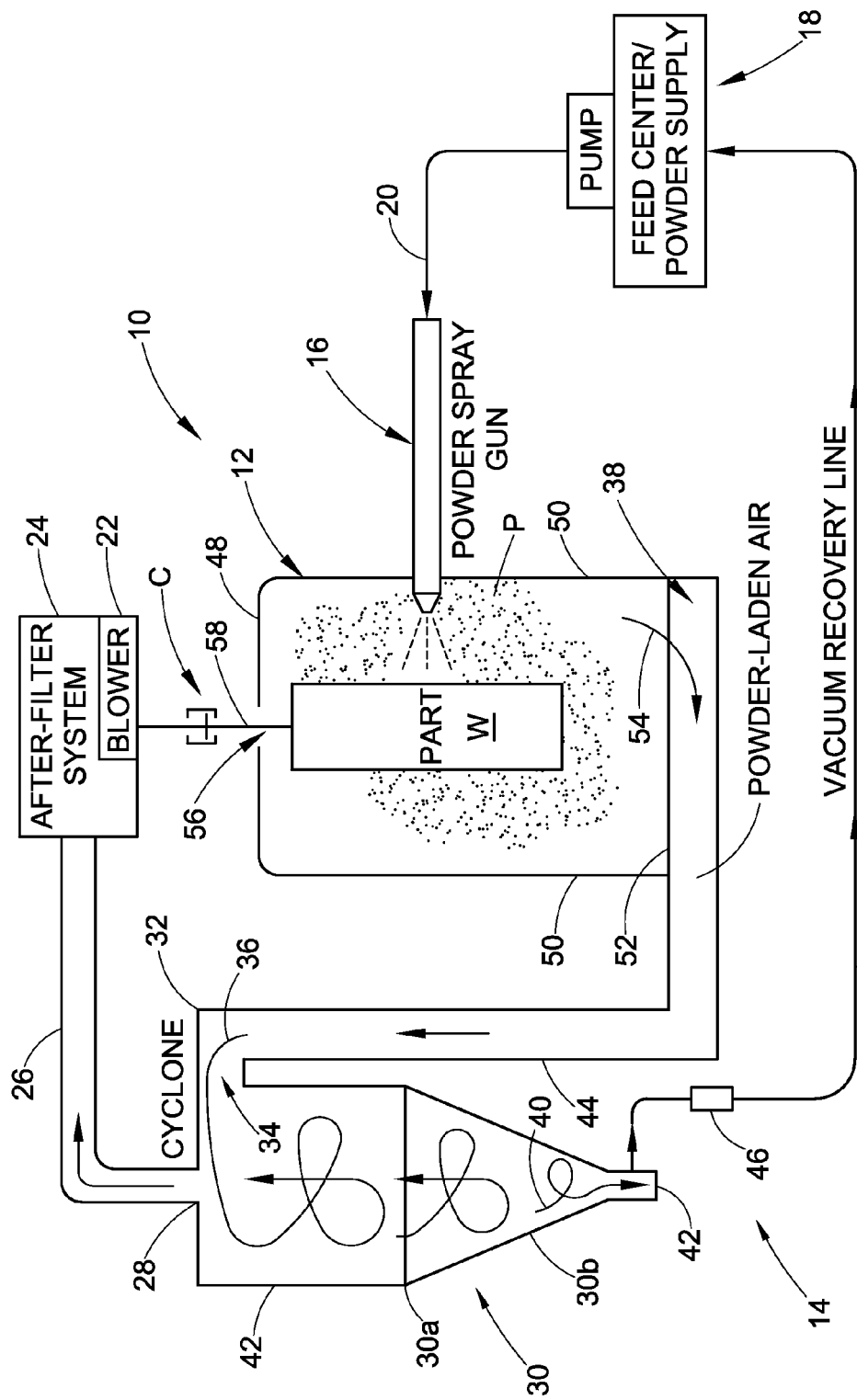
FIG. 1A is a simplified schematic diagram of a powder coating system having a prior art powder cyclone separator.

FIG. 1A illustrates a powder coating material application system 10 that includes a spray booth 12 and a powder overspray recovery system 14. The spray booth 12 in this embodiment may be supported on a structural frame (not shown) above the shop floor. We describe a prior art powder coating system to provide context for understanding the present inventions, but the present inventions may be used with many different powder coating systems, either those known or later developed. The present inventions are directed to the cyclone separator as will be fully described hereinbelow. For further reference, a spray booth that may be used with the concepts of the present inventions is described in U.S. Pat. No. 7,014,556, the entire disclosure of which is fully incorporated herein by reference. Many other spray booth design alternatives, however, may be used.

Typically, a plurality of powder coating material application devices 16 such as, for example, a spray gun, are used to coat workpieces W with powder coating material P as the workpieces W advance through the spray booth 12 interior. These application devices 16 may include automatic and manual spray guns, for example. Automatic spray guns often are mounted on a gun mover system (not shown) which may include a reciprocator or oscillator. The gun mover system may be used to both extend and retract the spray guns with respect to the spray booth 12 and also may be used to produce an up/down oscillatory motion of the guns during a coating operation. The spray guns 16 may be selected from any number of spray gun designs, including but not limited to an ENCORE® spray gun available from Nordson Corporation, Westlake, Ohio. The spray guns 16 may be electrostatic, non-electrostatic, tribo-charging or other designs and spraying technology may be used. A series of vertical gun slots or openings in the spray booth walls may be provided for automatic spray guns, and the spray booth 12 may also include other openings through which an operator can manually spray workpieces.

A feed center 18 may be provided that contains a supply of powder coating material P that will be applied the workpieces within the spray booth 12. The feed center 18 for example may include any number of hoppers, boxes or other containers of powder, along with suitable pumps and hoses to feed material to the one or more spray guns 16. A powder hose 20 connects a powder input of the spray gun 16 to an output of a powder pump (not shown) which may be located in the feed center 18 or other convenient location. Not all powder coating systems utilize a feed center and in other embodiments, powder coating material may be supplied to the spray gun 16 simply using a pump that draws powder from a box or hopper or other container. An example of a feed center 18 is described in U.S. Pat. No. 7,325,750 for POWDER COATING SYSTEM WITH IMPROVED OVERSPRAY COLLECTION, issued Feb. 5, 2008, and also United States published patent application no. US 2008/0017103 A1 for SUPPLY FOR DRY PARTICULATE MATERIAL which was published on Jan. 24, 2008; the entire disclosures of which are fully incorporated herein by reference. However, many different feed centers or other supplies for powder coating material may be used as needed. The U.S. Pat. No. 7,325,750 feed center may, for example, be used with Venturi type pumps for dilute phase systems and the 2008/0017103 feed center may be used, for example, with dense phase pumps for dense phase systems. But the present inventions may be used with dense phase or dilute phase pumps and powder spray systems.

A suitable operator interface to a control system (not shown) may be provided to control operation of the spray guns 16, the powder recovery system 14, the spray booth 12 including an overhead conveyor C, the gun mover system, gun controls, feed center and pump controls and so on, as is well known to those skilled in the art and need not be described herein to understand and practice the present inventions. The control system and the operator interface may be selected from any number of well known control system concepts as are well known to those skilled in the art, or specifically designed for a particular system.

In the example of FIG. 1A, the powder overspray recovery system 14 is realized in the form of is powder cyclone arrangement. Depending on how much powder overspray needs to be extracted from the spray booth, a single cyclone, twin cyclone or more cyclones alternatively may be used. A blower 22 and an after filter system 24 are in fluid communication through duct work 26 with an exhaust air outlet 28 of the cyclone 30, and provide the air flow required for operation of the cyclone powder recovery system 14. The blower 22 produces a large air flow into the cyclone 32, in the form of a substantial powder entrained air flow pulled from the spray booth 12 interior to an intake duct 32 of the cyclone. The cyclone 30 includes a tangential inlet 34 (relative to a vertical axis of the cyclone) to cause the familiar cyclonic circulation 36 that causes separation of powder from the air.

The air flow produced by the powder recovery system 14 also produces a substantial flow of air into and through the spray booth 12, sometimes referred to as containment air. The containment air flow prevents the loss of powder overspray outside the spray booth 12. Powder overspray that does not adhere to the workpiece W during a powder coating operation falls by gravity and also may be assisted to flow by the containment air into a recovery duct 38. This recovery duct 38 may be below the spray booth floor, for example. However, many designs are available for providing fluid communication between the spray booth 12 and the cyclone inlet 34 that do not use a subfloor duct. The powder entrained air is thus drawn into the cyclone 30.

Typically, the after filter system 24 and blower 22 draw a substantial flow of air or powder entrained air into the cyclone 30 and the separated powder descends as indicated by the arrow 40 to a cyclone outlet 42. From the outlet 42 the recovered powder may be returned to the feed center 18 or otherwise dumped to waste or reclaimed in some other manner. The powder entrained air into the cyclone tangential inlet 34 via the intake duct 32 may be drawn through a vertical extraction duct 44.

Recovered powder overspray that has been separated by the cyclone 30 may be recovered from the cyclone outlet 42 and returned to the feed center 18, as is commonly done if the powder will be reused, or alternatively may be conveyed to another container or receptacle or dumped to waste. A transfer pump 46 may be used to pull the recovered powder from the outlet 42 of the cyclone 30 to transfer the powder back to the feed center 18 through a transfer powder hose 60 or otherwise disposed. The cyclone 30 may include a transfer pan (not shown in FIG. 1A) that provides an interface for collection of the powder that falls from the cyclone 30 interior and the transfer pump 46.

The spray booth 12 may be generally rectangular in shape although other shapes and configurations may conveniently be used. A spray booth 12 will typically have a longitudinal axis X into the plane of the drawing for FIG. 1A, which is typically the axis along which the conveyor C moves the workpieces W through the spray booth 12. The spray booth 12 may have a ceiling 48 supported by one or more vertical sides or walls 50, and a floor 52. As represented by the arrow 54, powder overspray tends to fall to the floor 52 and pass through openings, duct work or other access in the floor to an exhaust opening that is in fluid communication with the recovery duct 38. The ceiling 46 may include an overhead conveyor slot 56 that allows hangers 58 to extend from the conveyor C to suspend workpieces inside the spray booth 12 interior.

All of the panels for the spray booth structure, including by not limited to the floor 52, ceiling 48, walls 50 and so on may each be made of composite materials including a foam core panel and gelcoat inner surface such as sold by Nordson Corporation in powder coating booths as an Apogee® panel structure. Other materials may alternatively be used as required, for example, PVC walls and panels. The Apogee® panel construction is also described in U.S. Pat. No. 6,458,209 for POWDER COATING BOOTH CONTAINMENT STRUCTURE issued to Shutic, Oct. 1, 2002, the entire disclosure of which is fully incorporated herein by reference.

DETAILED DESCRIPTION

It should be noted that the schematic representation of the cyclone 30 in FIG. 1A highlights a feature of traditional powder cyclone separators such as are used in known powder coating systems. That feature is the final assembled construction of the cyclone as a single or unitary structure with respect to the powder intake and separation structure. In other words, a traditional cyclone 30 includes an intake portion 30*a* and a separator portion 30*b*, but these portions are made of substantial metal walls that are integral, or not easily separable, after final assembly, and would not be deconstructed once the cyclone is installed in a facility for normal use. Even though the separation portion 30*b* may be provided with access doors for cleaning the cyclone interior, it is very difficult to clean the upper reaches of the intake portion 30*a*. Cyclone separators used with powder coating systems are large volume structures and may extend 20 feet or higher above the shop floor. This makes access to the upper interior surfaces, especially internal cones and other surfaces near the exhaust outlet 28 difficult visually to observe and clean.

Turning to FIG. 1, in accordance with our inventions, we illustrate an embodiment of a powder cyclone separator 62 (also referred to herein as a cyclone) that may be used with a powder coating system, for example the embodiment of FIG. 1A herein or others, that is easier and faster to clean and easier to verify that all interior surfaces have been cleaned. This can significantly reduce color change times for example or other maintenance activities. One concept is that the cyclone 62 is designed as two separate and separable sections that can be horizontally and optionally vertically separated and moved relative to each other. The two sections can be mated together to form a complete cyclone that will separate powder from air, but then also can be easily separated into two sections that can be moved apart to facilitate cleaning and visual inspection of interior surfaces. When we say that the two sections can be mated together, we mean that the two sections can be brought together in sufficiently close proximity so that a fully functional cyclone is provided. We do not mean to require or imply that mating the two sections means that the sections are secured or fastened together although such is an alternative option, for example with easy release clamps. As will be described hereinbelow, we mate the upper and lower sections so as to provide a sufficiently enclosed volume so that normal cyclonic function is available. This does not require a sealed or an air tight mating joint or connection between the upper and lower sections as will be appreciated from the below discussion.

In our exemplary embodiment of FIGS. 1-6, the cyclone 62 comprises an upper section or shell and a lower section or shell extension that can be easily moved away from said upper section so that an operator can more easily inspect the interior surfaces of the upper section and clean those interior surfaces. The lower section need only be moved far enough to allow operator access to the interior of the upper section. Alternatively, the lower section may be moved as far away as the operator wishes, and in one embodiment we provide for the lower section to be rolled away, as will be described below. The cyclone 62 may be used with the powder coating system exemplified in FIG. 1A or any other powder coating system as needed.

When we discuss the cyclone 62 has having two sections that are separable, we do not require or imply that there are only two functional sections. A cyclone may have many functional and optional sections including a banjo, an intake section, an outlet section, a transfer pan perhaps and so on. But by two sections that are separable or separate sections we mean that the cyclone is configured so that an operator may separate the cyclone into two major parts with one of the parts being movable with respect to the other. Because the upper section typically will be connected by ductwork to the after filter system, we provide structure to facilitate movement of the lower section away from the upper section.

For convenience, we provide a cyclone 62 with a first or upper section 64 (also referred to herein as the cyclone upper section) and a second or lower section 66 (also referred to herein as the cyclone lower section) that may each be approximately half the overall cyclone structure. But such is not required, and the designer may provide the cyclone in two sections that would not be considered to be an upper half and a lower half. We chose to divide the cyclone in two sections in such a way so that the lower section 66 is not excessively weighted to facilitate movement, and also to provide a sufficiently large and easily accessed opening to the upper section 64. Note that in the exemplary embodiment, for example, the upper section 64 may include a portion 64a that forms part of the conical portion of the lower section 66. In general, the upper section 64 comprises the intake portion for the cyclone including the tangential inlet, and the lower section 66 comprises the powder separator or recovery section of the cyclone including a cyclone outlet.

The cyclone 62 may be supported on a frame 68. In the exemplary embodiment, the frame comprises two parts, a first frame or first frame section 70 and a second frame or second frame section 72. The first frame 70 is used to support the cyclone upper section 64 and the second frame 72 is used to support the cyclone lower section 66. Although our frame 68 is exemplified herein as being made of two distinct and separate structures, such may not be required. It is an option to provide what would be considered a single frame that would have a portion that allows for the relative movement between the first and second sections 64, 66 of the cyclone 62. For example, the cyclone lower section 66 may be supported on a frame portion that swings out or pulls out or otherwise can be moved away from a stationary portion of the frame, yet the moveable portion of the frame is supported on the overall frame structure. And alternatively more than two frame structures may be used as needed. But the exemplary embodiment herein utilizes two frames as a simple and cost effective way to realize the concepts of the present inventions.

Because in this embodiment we provide the cyclone upper section 64 as being stationary after the upper section 64 is connected with the after filter ductwork, the first frame 70 is preferably although need not be securely lagged to the shop floor. The second frame 72 on the other hand may include a floor support arrangement 74 that facilities movement of the second frame 72 and the cyclone lower section 66 that is supported by the second frame 72. The floor support arrangement 74 may be any convenient means by which the second frame 72 and cyclone lower section 66 can be moved away from the first frame 70 and cyclone upper section 64. For example, we provide a floor support arrangement 74 that includes casters 76 or other mechanisms that allow the second frame 72 to be rolled over the shop floor surface. But rolling movement is not required and alternative techniques may be used such as sliding on rails or using tracks. The amount of movement is a matter of design choice and can be as short as a foot or two or less just enough to gain access to the cyclone upper section 64, or farther to allow the second frame 72 to be moved completely away from the first frame 70.

Figure 2:
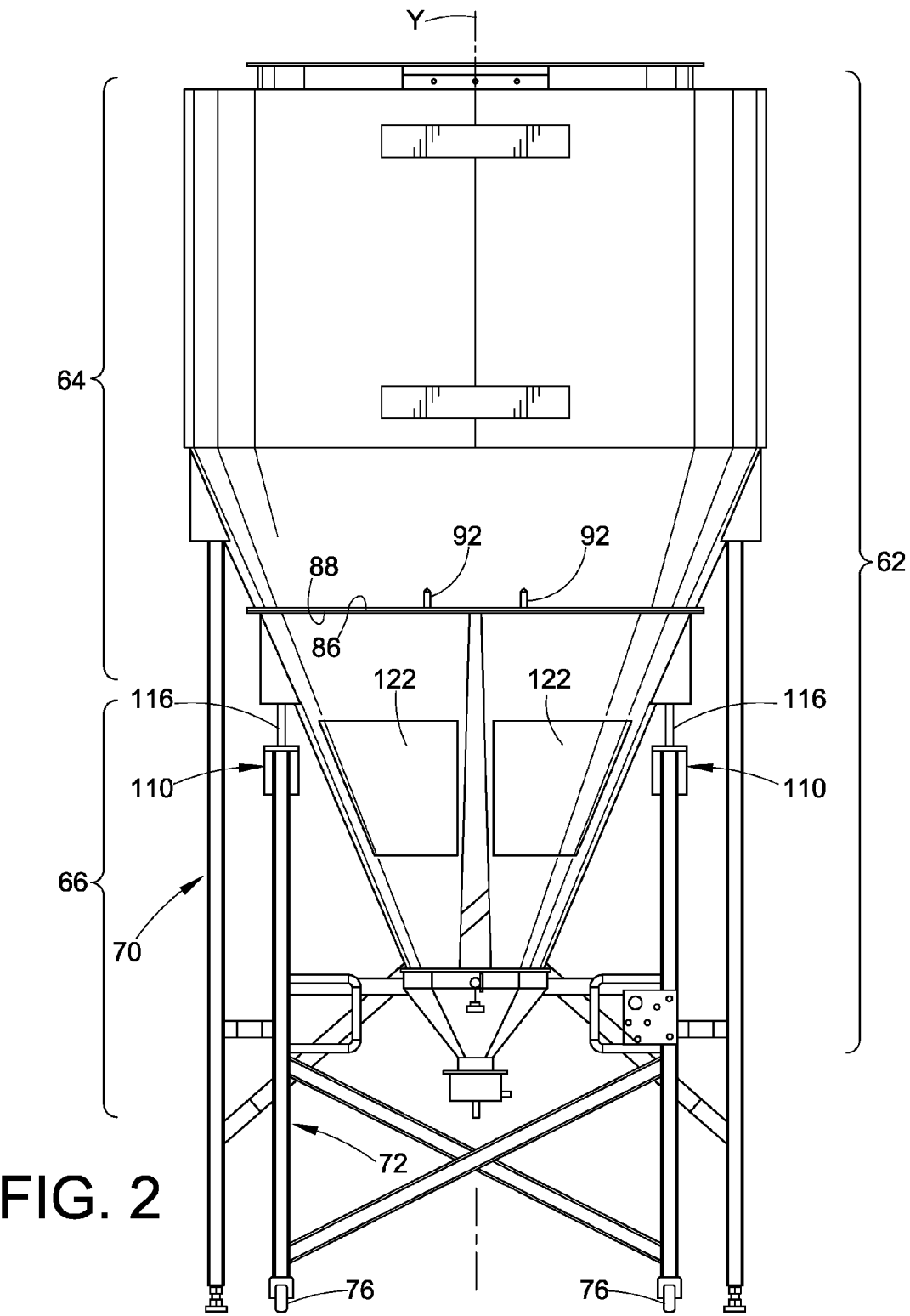
FIG. 2 is a front elevation of the arrangement of FIG. 1.

As is readily apparent from FIGS. 1 and 2, we prefer but do not require that the second frame 72 nest fully within the first frame 70 so as to facilitate alignment between the upper section 64 and lower section 66 of the cyclone 62. FIG. 1 illustrates the lower section 66 being in position so that the upper section 64 and lower section 66 are aligned. FIG. 1 further illustrates the lower section 66 being vertically in a lowered position away from the upper section 64 as will be more fully described below. FIG. 2 illustrates the lower section 66 in a raised position to mate with the upper section 64.

With continued reference to FIGS. 1 and 2, the cyclone upper section 64 may be provided with a pair of diametrically positioned upper support flanges 78. The upper support flanges 78 may be attached to the cyclone 62, for example, by welding or other suitable technique. The upper support flanges 78 may be positioned so as to support the cyclone upper section 64 on the frame 68 by being attached to respective upper flange support surfaces 80 (also see FIG. 3) of the first frame section 70. Because the cyclone upper section 64 may be stationary, the upper section 66 preferably is securely mounted on the upper flange support surfaces 80, for example with bolts or clamps.

The cyclone lower section 66 may be provided with a pair of diametrically positioned lower support flanges 82. The lower support flanges 82 may be attached to the cyclone lower section 66, for example, by welding or other suitable technique. The lower support flanges 82 may be positioned so as to support the cyclone lower section 64 on the frame 68 by being mounted on respective lower flange support surfaces 84 (also see FIG. 4) of the second frame section 72. As will be further described, it is preferred, although in some embodiments may be optional, that the cyclone lower section 66 be vertically separable relative to the cyclone upper section 64. In other words, it is preferred although not required in all designs, that the lower section 66 can be raised and lowered relative to the upper section 64 so as to mate with the upper section 66 in the raised position (FIG. 2) and separated vertically from the upper section 64 when moved to the lowered position (such as in FIG. 1). In such cases, for example, each lower support flange 82 may be attached to a respective lower support plate 84 in a manner which permits the lower section 64 to be moveable by a mechanism for raising and lowering the lower section 64, as will be further described below. Whether the option of providing vertical movement for the lower section 66 is used will depend on various factors, particularly how close the mating interface can be made between the upper section 64 and the lower section 66 to have proper cyclone operation. It may be decided to have a close but non-contact or alternatively low friction interface in the mated position so that the lower section 66 can be laterally moved away from the upper section 64 without having to necessarily vertically lower the lower section 66 away from the upper section 64.

The cyclone lower section 66 may include a first or lower section mating flange 86 and the cyclone upper section 64 may include a complementary second or upper mating flange 88. When the lower section 66 is optionally raised vertically to a mating position shown in FIG. 2, these upper and lower mating flanges 88, 86 may abut each other. As part of the overall system setup, it will be preferred to level the first and second frames 70, 72 not only to have proper vertical orientation of the cyclone 62 but also to provide a good mating interface between the upper section 64 and the lower section 66 to obtain the desired cyclonic operation. But this abutting mating interface does not require a perfect flush interface or even contact between the facing surfaces of the flanges 86, 88. We have found that the cyclone 62 can operate quite well as expected even with a small gap between the facing surfaces of the mated flanges 86, 88, whether that gap is about the entire circumference of the mated flanges 86, 88 or is less than continuous meaning that portions of the flanges may actually contact each other. We have found that a small gap between the facing surfaces of the flanges 86, 88 actually allows for a flow of air across the flanges 86, 88 facing surfaces to reduce powder collecting on those surfaces in that there is a negative pressure condition within the cyclone. Alternatively, but optionally, a seal may be provided between the facing surfaces of the mated flanges 86, 88 although we have found such a seal to be unnecessary.

In order to assist in proper alignment of the upper section 64 with the lower section 66 when the lower section 66 is mated to the upper section 64, we provide an optional alignment structure 90. The exemplary embodiment herein of the optional alignment structure 90 may include self-centering alignment pins 92 on the lower section flange 86 that align with and pass through alignment holes 94 in the upper section flange 88. When the lower section 66 is raised, the self-centering pins 92 will interface with the holes 94 to assure that the upper section 64 and the lower section 66 are laterally aligned about a central vertical longitudinal axis Y of the cyclone 62 as the cyclone sections 64, 66 are mated. The alignment structure 90 is considered optional as the frame 68 can be designed to assure alignment, particularly when a single frame structure optionally is used. As another alternative, the pins 92 and the holes 94 may be reversed as to which flange each is disposed upon. More or fewer pins and holes may be used and entirely different structure may be used to assist in alignment such as other mechanical interfaces.

As illustrated in FIG. 2, when the lower section 66 is raised to a mating position with the upper section 64, a complete cyclone is presented and will function as a traditional single housing cyclone.

Figure 3:
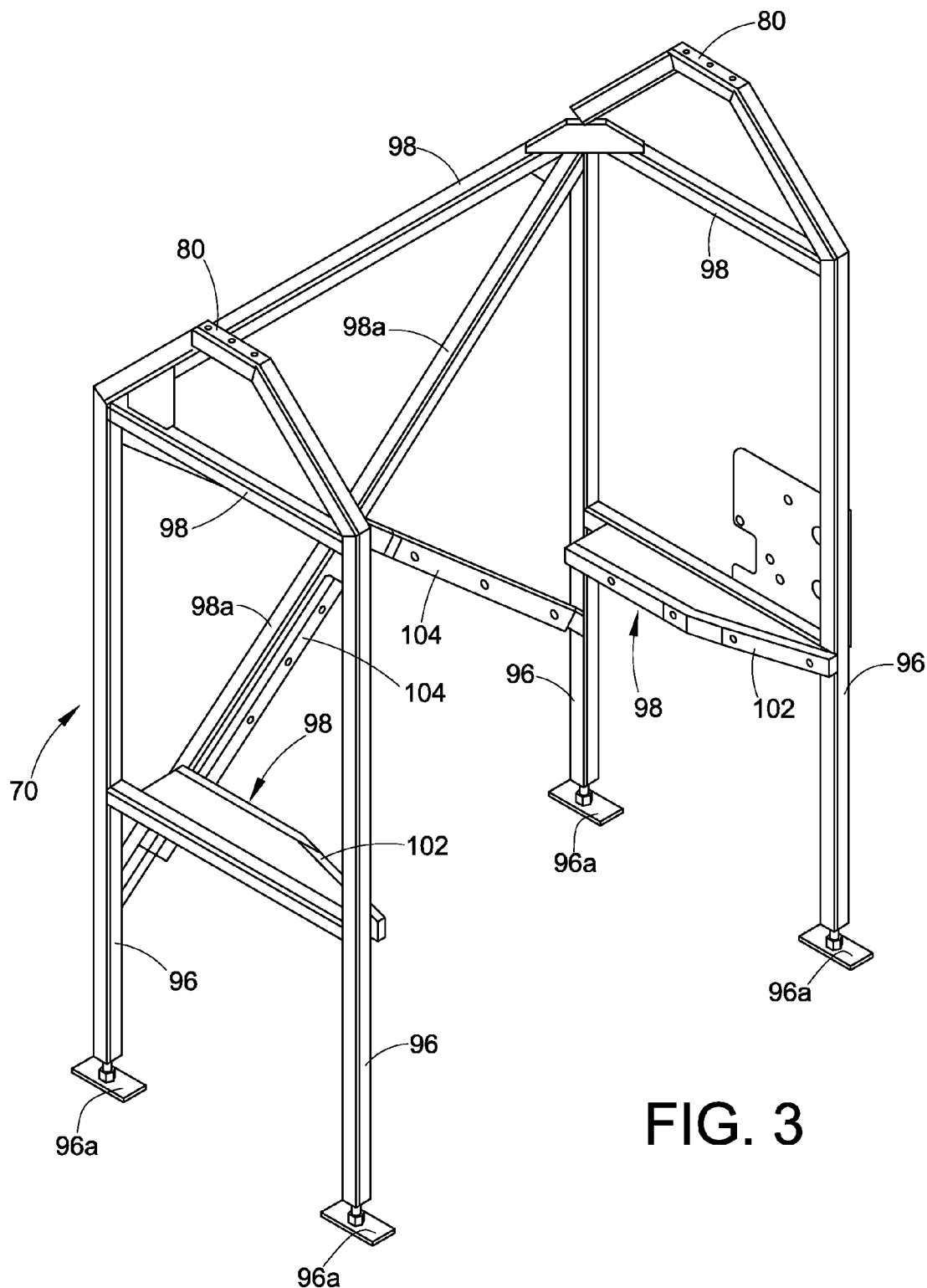
FIG. 3 is a perspective elevation of a first frame used to support a cyclone upper section in FIG. 1.

With reference to FIG. 3, the first frame 70 may include a plurality of support legs 96 with braces 99, some of which may form cross-braces 99*a* as needed, for additional support. The design and configuration of the frames 70, 72 are a matter of design choice, although it is preferred but not required that the frames 70, 72 nest with each other, and that the second frame 72 that supports the cyclone lower section 66 be easily moveable such as by rolling, for example.

The first frame legs 96 may have plates 96*a* that are lagged to the shop floor, by any suitable technique, to provide stability for the cyclone upper section 64.

Figure 4:
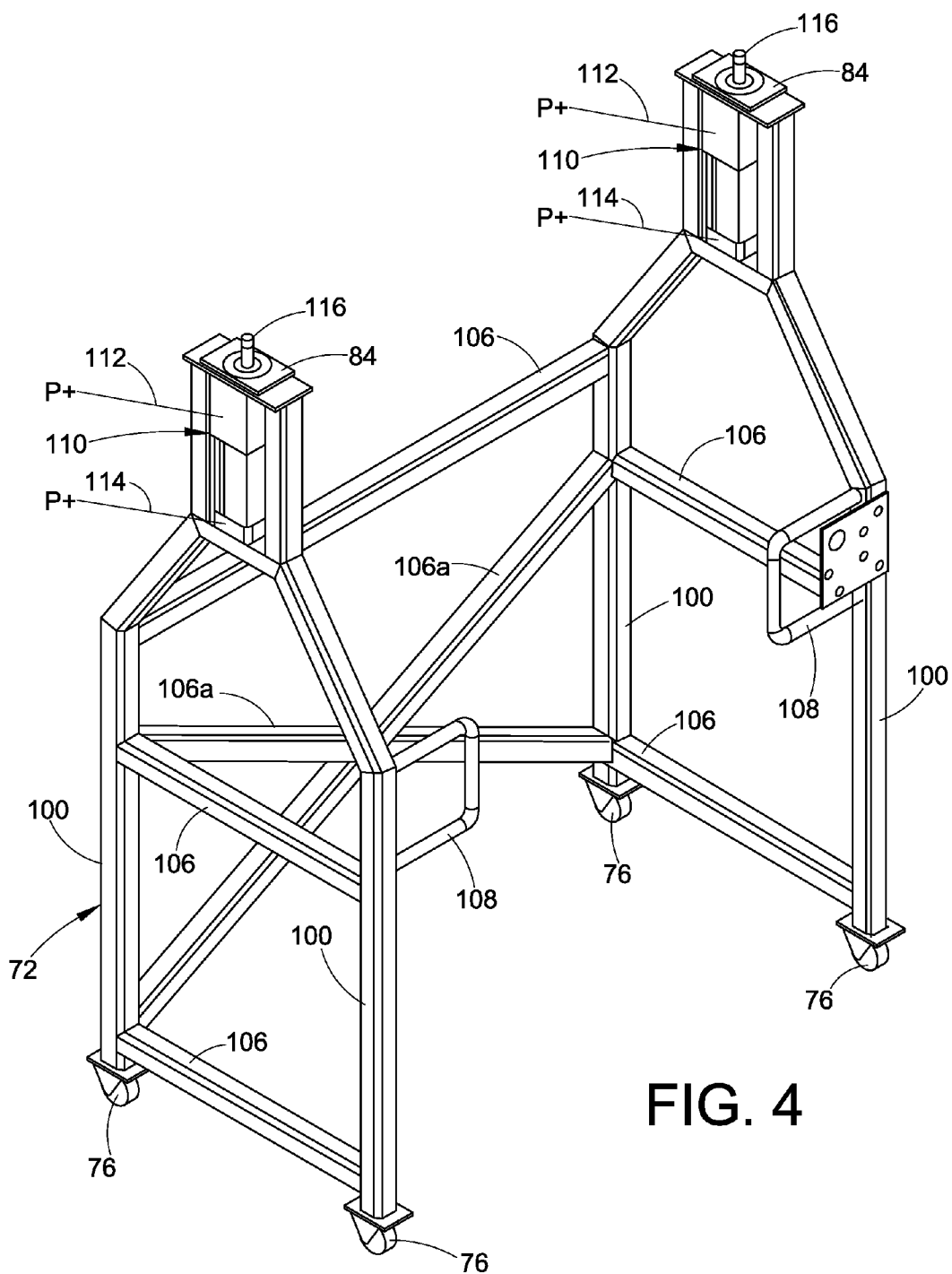
FIG. 4 is a perspective elevation of a second frame used to support a cyclone lower section in FIG. 1.

FIG. 3 also illustrates another optional structure for aligning the second frame 72 with the first frame 70 as the second frame 72 is rolled into the first frame 70 so as to position and align vertically and laterally the cyclone lower section 66 under the cyclone upper section 64. The first frame 70 may be provided with side bumpers 98. With reference to FIG. 1 and FIG. 4, the side bumpers 98 may be laterally dimensioned and profiled so as to contact surfaces of support legs 100 of the second frame 72 as the second frame 72 is rolled into the first frame 70. As best illustrated in FIG. 3, the side bumpers 98 may have tapered portions 102 so as to allow the operator to shift and move the second frame 72 laterally in order to closely fit the second frame 72 within the first frame 70, thereby assuring good alignment between the upper section 64 and the lower section 66 of the cyclone 62. The side bumpers 98 may be constructed of any suitable material, such as PVC for example, to provide a nice smooth low friction contact with the second frame 72. The first frame 70 may also be provided with back bumpers 104 on the cross-braces 99*a* or other suitable location so that an operator can push the second frame 72 into the first frame 70 until contact with the back bumpers 104 is made, further assuring depth alignment between the cyclone upper section 64 and the cyclone lower section 66 before raising the lower section 64. The bumpers 98, 104 can be sized and adjusted on a case by case basis if so desired at system setup to provide excellent vertical and lateral alignment between the upper section 64 and the lower section 66.

FIG. 4 illustrates the second frame 72. The second frame 72 may also include a plurality of vertical support legs 100 and braces 106, including cross-braces 106*a*, as needed. In addition, the second frame 72 may include one or more handles 108. The handles 108 may be conveniently positioned on the second frame 72 so that an operator can grasp either or both handles to move the second frame 72 horizontally relative to the first frame 70, as well as to help align the first and second frames 70, 72 when the second frame 72 is being rolled into nest with the first frame 70.

With continued reference to FIG. 4 as well as FIGS. 1 and 2, we illustrate an optional actuator assembly or means 110 for vertically raising and lowering the cyclone lower section 66 relative to the cyclone upper section 64. The exemplary actuator means 110, although not required, utilizes a pair of pneumatic cylinders 110 to raise and lower the cyclone lower section 66. Each pneumatic cylinder 110 may include two pressurized air inputs 112, 114 as schematically represented on FIG. 4, using suitable known fittings (not shown) to extend and retract a cylinder rod 116 (see FIG. 2). One of the pressurized air inputs 114 extends the cylinder rod 116 out, which is the up direction as viewed in the drawings, to raise the cyclone lower section 66 to mate with the cyclone upper section 64, which is the position shown in FIG. 2. The other pressurized inlet 112 is used to retract the cylinder rod 116 so as to lower the cyclone lower section 66 away from the cyclone upper section 64 (FIG. 1). This lowering operation results in vertical separation of the upper and closer section 64, 66. It is a preferred though not required safety feature to use pneumatic cylinders that include an internal brake, so that in the absence of pressurized air the brake will not allow the cylinder rod 116 to move up or down. Many other types of actuators other than pneumatic cylinders may be used to raise and lower the cyclone lower section 66 relative to the upper section 64. The pneumatic cylinder rods 116 may be secured in any suitable manner with the lower support flanges 82 of the cyclone lower section 66 such as using the lower flange support surfaces 84. Because two or more actuators may be used, we also provide a pressure balancing valve (not shown) to assure that the actuators operate at the same speed to raise and lower the cyclone lower section 66.

Figure 5:
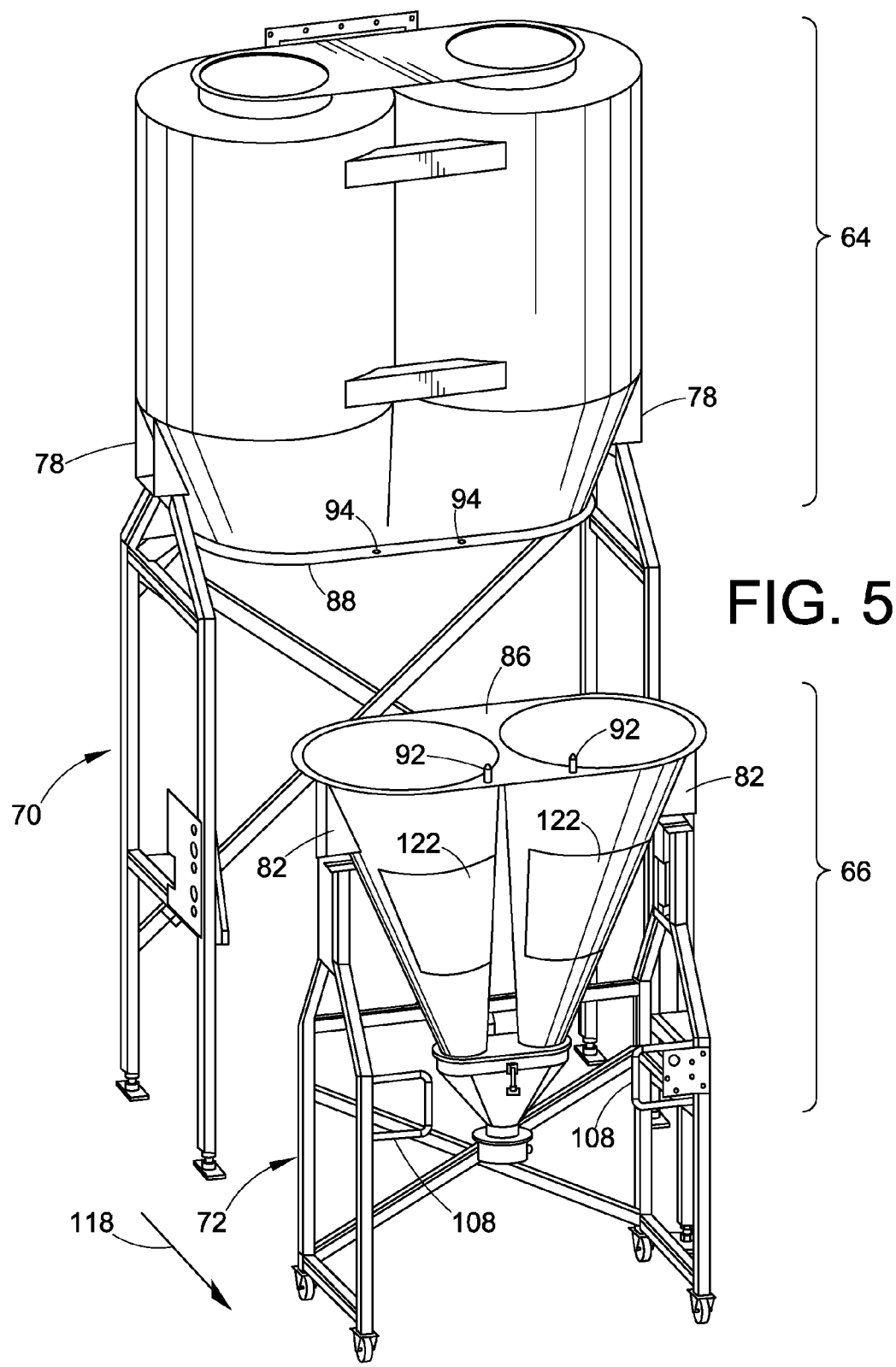
FIG. 5 is a perspective elevation of the embodiment of FIG. 1 depicting a lower section of the cyclone rolled away from an upper section of the cyclone.

With reference to FIG. 5 and with comparison to FIG. 1, after the cyclone lower section 66 has been vertically lowered away and separated from the cyclone upper section 64, the operator can grasp the handles 108 and pull the second frame away 72 from the first frame 70 such as by a rolling action and as represented by the arrow 118. The process can be reversed in order to nest the second frame 66 within the first frame 64, thereby aligning vertically and horizontally the two frames 70, 72 as well as the cyclone upper section 64 with the cyclone lower section 66. The operator can thereafter raise the cyclone lower section 66 so as to mate with the cyclone upper section 64 as described above. From FIG. 5 it will be apparent to those familiar with cleaning out cyclones that the cyclone upper section interior surfaces can easily be accessed for cleaning the interior surfaces of the upper section, such as, for example, with an air wand, and visual inspection is greatly enhanced.

With reference to FIG. 6, we note several additional features that may be used. The cyclone lower section 66 conical portions 120 commonly include access doors 122 which can swing open. This allows an operator to access the interior of the cyclone, and in the exemplary embodiments herein, to clean the interior 124 of the cyclone lower section 66 with an air wand or other suitable means. During cleaning, the after filter blower 22 (FIG. 1A) is on, thus creating suction up through the cyclone 62. This occurs even with the cyclone lower section 66 vertically separated from the cyclone upper section 64 as in FIG. 1. Therefore, the operator can blow off the interior surfaces of the lower section 66 and the removed powder will be drawn up into the after filter 24 (FIG. 1).

It is to be noted that although the exemplary embodiments herein are described with reference to a twin cyclone arrangement, the inventions may be used with a single cyclone if desired or with more cyclones associated with a spray booth 12.

Still referring to FIG. 6, the second frame 72 may include a plate 126 that may be mounted on the second frame 72 and that supports a pump, which may be but need not be the transfer pump 46 described above with reference to FIG. 1A. The transfer pump 46 includes a hose (not shown in FIG. 6) that connects at a first end to a powder inlet 46a to the pump 46 and at a second end to an output connection 128a fitting of the transfer pan 128 located at the bottom of the cyclone 62. The transfer pan design is optional, and other well known structures may be used to interface the transfer pump 46 with the cyclone outlet 42 to reclaim the powder that the cyclone 62 has separated and to transfer that powder to reclaim, such as the feed center 18 or other receptacle.

With continued reference to FIG. 6, we provide a control mechanism, device or arrangement 130 for the operator to use manually to control operation of the actuator assembly 110. The control mechanism 130 may be disposed on a plate 131 that is mounted on the second frame 72. The control mechanism 130 may include a two position switch 132 is used that can be manually controlled with a knob 132a. The switch 132 may be used to control a two position valve 134. The valve 134 receives positive air pressure at an inlet 136 and has two selectable outputs 138a and 138b. Turning the knob 132a to a first position connects the inlet pressure 136 to one of the outputs 138a and turning the knob 132a to a second position connects the inlet pressure 136 to the other output 138b. An air line 140 connects the first output 138a to one input 114 (FIG. 4) of the actuator 110 to cause the pneumatic cylinder to extend the cylinder rod 116 thereby raising the cyclone lower section 66. An air line 142 connects the second output 138b to another input 112 (FIG. 4) to the actuator 110 to cause the pneumatic cylinder to retract the cylinder rod 116 thereby lowering the cyclone low section 66. The two position switch 132 may be used to control both actuators 110 at the same time by simply splitting the air lines 140, 142 to each actuator 110. A suitable two position valve could be a spool valve or slide valve, as an example. Many alternative control techniques may be used to provide the pneumatic pressure selectively to the actuators 110 to raise and lower the cyclone lower section 66.

Another aspect of the present inventions is that the separable two section cyclone 62 facilitates cleaning the cyclone. An exemplary method begins after coating operations are completed. If the powder coating material that will next be used is different from the last used material, for example a different color, then the cyclone needs to be cleaned to avoid contaminating the next coating operation. To start the method, the blower 22 will continue to run while the operator opens the access doors 122 and uses an air wand to blow off the interior surfaces of the cyclone lower section 66. During this time the cyclone lower section 66 may be left in the raised position of FIG. 2 although it may also be cleaned in the lowered position of FIG. 1. Next, the operator turns the knob 132a to a first position to lower the cyclone lower section 66 if not previously lowered and may grasp the handles 108 and pull the second frame 72 away from the first frame 70. The operator may roll the second frame 72 completely away from the first frame 70 or only as far as needed to allow for access to the cyclone upper section 64. The operator then can use an air wand to blow off the interior surfaces of the upper section 64 even including all surfaces in the upper reaches of the cyclone near the banjo for example. After the cyclone interior surfaces are cleaned, the operator can roll the second frame 72 back into the first frame 70 to nest the frames together and align the cyclone lower section 66 with the cyclone upper section 64. The operator can next turn the knob 132a to a second position to raise the cyclone lower section 66 to mate with the cyclone upper section 64 and the cyclone 62 is again fully operational.

This method is highly advantageous in that it allows the operator to see virtually all internal surfaces of the upper and lower cyclone sections so that the operator can effectively clean those surfaces of any residual powder coating material adhering to the internal surfaces of the upper and lower cyclone sections. This prevents, or reduces the risk that, in the absence of the present inventions, prior powder coating material will adhere to a hidden internal surface of the upper or lower cyclone section that is not visible to the operator, with that powder coating material later becoming dislodged and sprayed onto a part that is being powder coated with a subsequent powder coating material. This subsequent dislodging of hidden powder can cause spots of the prior color of powder coating material to appear in workpieces or articles being coated with the current color of powder coating material, creating an unsatisfactory coating on the article.

It is intended that the inventions not be limited to the particular embodiments disclosed for carrying out the inventions, but that the inventions will include all embodiments falling within the scope of the appended claims.

The invention claimed is:
1. A powder coating system, comprising:
a powder coating booth,
a cyclone for removing powder overspray from said powder coating booth, said cyclone comprising an upper section and a lower section, said upper and lower sections being vertically separable from each other, a frame that supports said cyclone upper section and said cyclone lower section so that said cyclone lower section can be moved laterally away from said cyclone upper section, said frame comprises a first frame for supporting said cyclone upper section in a stationary position and a second frame for moveably supporting said cyclone lower section.

2. The powder coating system of claim 1 wherein said cyclone lower section can be raised and lowered with respect to said cyclone upper section.

3. The powder coating system of claim 2 comprising an actuator assembly for raising and lowering said cyclone lower section with respect to said cyclone upper section.

4. The powder coating system of claim 3 wherein said actuator assembly comprises a pneumatic cylinder.

5. The powder coating system of claim 1 wherein said second frame comprises a floor support that allows said second frame to be rolled away from said first frame with said cyclone lower section supported on said second frame.

6. The powder coating system of claim 5 wherein said floor support comprises wheel members supporting frame legs of said second frame.

7. The powder coating system of claim 2 wherein said cyclone lower section can be positioned in a first vertical position in which said cyclone lower frame mates with said cyclone upper section to form a cyclone, and can be positioned in a second vertical position in which said cyclone lower section is separated vertically from said cyclone upper section, whereby said cyclone second section can be laterally moved away from said cyclone first section.

8. The powder coating system of claim 2 comprising guide members that align said cyclone upper section with said cyclone lower section when said cyclone lower section is vertically raised to mate with said cyclone upper section.

9. The powder coating system of claim 1 comprising alignment members that center said cyclone lower section with said cyclone upper section when said cyclone lower section is moved laterally under said cyclone first section.

10. The powder coating system of claim 1 wherein said second frame nests within said first frame to allow said cyclone lower section to be vertically raised and mated with said cyclone upper section.

11. The powder coating system of claim 1 wherein said cyclone upper section comprises an intake for overspray powder drawn into said cyclone upper section and said cyclone lower section comprises a conical extension that receives separated powder coating material that falls from said cyclone upper section.

12. The powder coating system of claim 1 comprising an actuator assembly for raising and lowering said cyclone lower section with respect to said cyclone upper section, said actuator assembly comprises a pneumatic cylinder supported on said second frame and actuator control mounted on said second frame.

13. The powder coating system of claim 12 comprising a pump for drawing separated powder coating material from said cyclone lower section.

14. The powder coating system of claim 12 wherein said actuator control comprises a switch to selectively raise and lower said cyclone lower section.

15. The powder coating system of claim 1 further comprising a control mechanism mounted to said second frame.

16. The powder coating system of claim 15 wherein said control mechanism includes a manually operable switch that raises and lowers said cyclone lower section with respect to said cyclone upper section.

17. A powder coating system, comprising:

a powder coating booth, a cyclone for removing powder overspray from said powder coating booth, said cyclone comprising a cyclone upper section and a cyclone lower section, said cyclone upper section and said cyclone lower section being vertically separable from each other, a frame that supports said cyclone upper section and said cyclone lower section so that said cyclone lower section can be moved laterally away from said cyclone upper section, wherein said frame comprises a first frame for supporting said cyclone upper section in a stationary position and a second frame for supporting said cyclone lower section, wherein said second frame comprises a floor support that allows said second frame to be rolled away from said first frame with said cyclone lower section supported on said second frame, further comprising an actuator assembly for separating vertically said cyclone lower section from said cyclone upper section, at least a part of said actuator assembly being supported on said second frame.

18. The powder coating system of claim 17 wherein said actuator assembly comprises a pneumatic cylinder.

19. The powder coating system of claim 17 wherein said cyclone lower section can be positioned in a first vertical position in which said cyclone lower frame mates with said cyclone upper section to form a cyclone, and can be positioned in a second vertical position in which said cyclone lower section is separated vertically from said cyclone upper section, whereby said cyclone second section can be laterally moved away from said cyclone first section.

20. The powder coating system of claim 17 comprising guide members that align said cyclone upper section with said cyclone lower section when said cyclone lower section is vertically raised to mate with said cyclone upper section.

21. The powder coating system of claim 17 comprising alignment members that center said cyclone lower section with said cyclone upper section when said cyclone lower section is moved laterally under said cyclone first section.

22. The powder coating system of claim 17 wherein said second frame nests within said first frame to allow said cyclone lower section to be vertically raised and mated with said cyclone upper section.

23. The powder coating system of claim 17 wherein said cyclone upper section comprises an intake for overspray powder drawn into said cyclone upper section and said cyclone lower section comprises a conical extension that receives separated powder coating material that falls from said cyclone upper section.

24. The powder coating system of claim 17 further comprising a control mechanism mounted to said second frame.

25. The powder coating system of claim 24 wherein said control mechanism includes a manually operable switch that raises and lowers said cyclone lower section with respect to said cyclone upper section.

* * * * *